Figure 1:
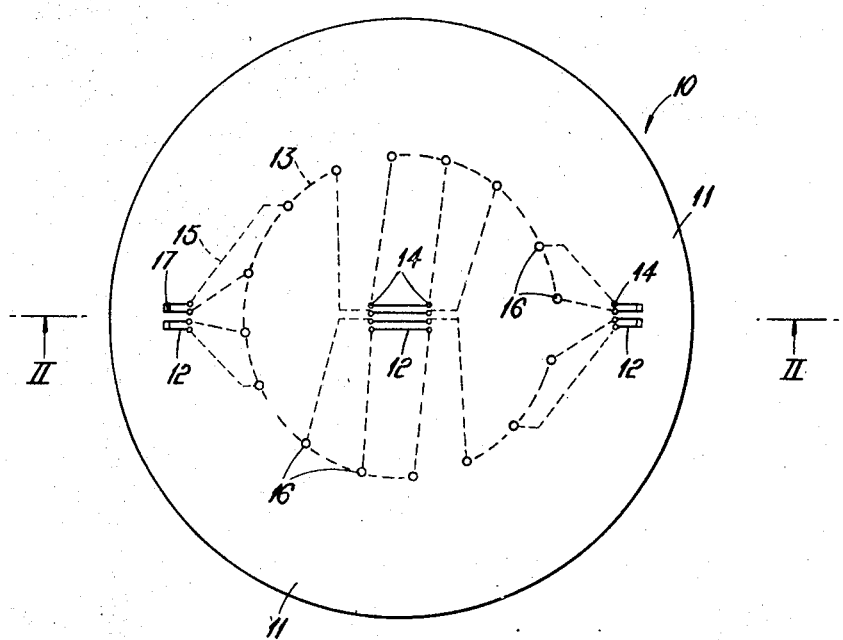

United States Patent
Thorp et al.

[15] 3,662,312
[45] May 9, 1972

[54] SEMICONDUCTOR STRAIN TRANSDUCERS

[72] Inventors: William Thorp, Timperley; Charles Trevor Jones, Wilmslow, both of England

[73] Assignee: Ferranti, Limited, Hollinwood, Lancashire, England

[22] Filed: Mar. 24, 1969

[21] Appl. No.: 809,848

[30] Foreign Application Priority Data

Mar. 23, 1968   Great Britain......................14,139/68

[52] U.S. Cl............................338/4, 73/88.5 SD, 73/398 AR, 338/3
[51] Int. Cl............................................G01l 9/06
[58] Field of Search................................338/2, 3, 5, 6, 9, 4; 73/88.5 SD, 398 AR

[56] References Cited

UNITED STATES PATENTS

| | | | |
|---|---|---|---|
| 2,599,578 | 6/1952 | Obert et al............................. | 73/88.5 |
| 3,568,124 | 3/1971 | Sonderegger........................... | 338/4 |
| 2,787,777 | 4/1957 | Camp...................................... | 340/10 |
| 3,290,928 | 12/1966 | Curry...................................... | 73/88.5 |
| 3,493,912 | 2/1970 | Tull et al................................. | 338/2 |

FOREIGN PATENTS OR APPLICATIONS 1,094,862  12/1967   Great Britain..............................338/2

Primary Examiner—T. H. Tubbesing
Assistant Examiner—R. Kinberg
Attorney—Cameron, Kerkam & Sutton

[57] ABSTRACT

A strain transducer having a plurality of piezo-resistive sensing elements formed adjacent to one major face of a semiconductor wafer is wholly assembled by employing techniques compatible with the structure of the semiconductor wafer, these techniques including bonding the wafer to a rigid metal supporting ring which in turn is bonded to an annular insulating member secured to the transducer housing.

15 Claims, 5 Drawing Figures

SEMICONDUCTOR STRAIN TRANSDUCERS

This invention relates to strain transducers each of which has a plurality of piezo-resistive strain sensing elements formed in a semiconductor wafer.

In such arrangements the resistor sensing elements are of one conductivity type and are formed in wafers of opposite conductivity type, these resistors being substantially electrically but not mechanically isolated by the P-N junctions serving to define them in the wafers. Each wafer comprises a flexible beam or diaphragm and the resistance value of the associated sensing elements alters with variations in the stress applied to the material. These sensing elements are included in a resistive bridge circuit so that a sensitive transduce capable of measuring small forces or pressure is provided. Such a transducer may be extremely small in size and its size and sensitivity render it suitable for many applications, for example, in the medical field.

It is an object of the present invention to provide a strain transducer of a simple construction, which transducer construction permits the semiconductor wafer diaphragm to be assembled wholly by employing techniques compatible with its construction.

According to the present invention a strain transducer includes a plurality of piezo-resistive strain sensing elements formed adjacent to one major face of a semiconductor wafer and defined by P-N junctions, a metal ring alloyed to circumferential parts of the semiconductor wafer, an annular member of insulating material having a plane surface at least partially metallized and cooperating with the metal ring to which it is bonded, a housing secured to the insulating annular member and enclosing the major wafer face adjacent to the sensing elements with the opposite major wafer face arranged to be exposed to the medium the pressure of which is required to be measured, and wires extending between contacts to the sensing elements and leads extending externally of the housing.

The metal ring imparts rigidity to the semiconductor wafer to which it is alloyed. This metal ring is easily bonded by conventional techniques to the metallized surface of the insulating annular member serving to isolate electrically the wafer from the housing to which it is secured and which may be of metal.

Figure 2:
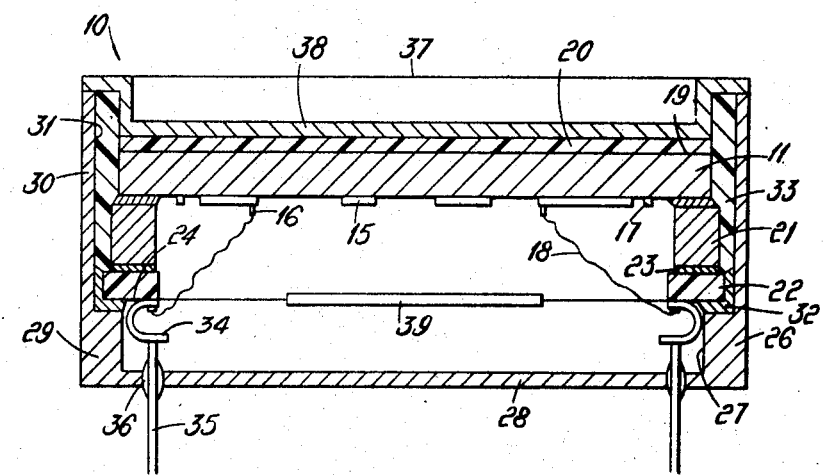
Figure 3:
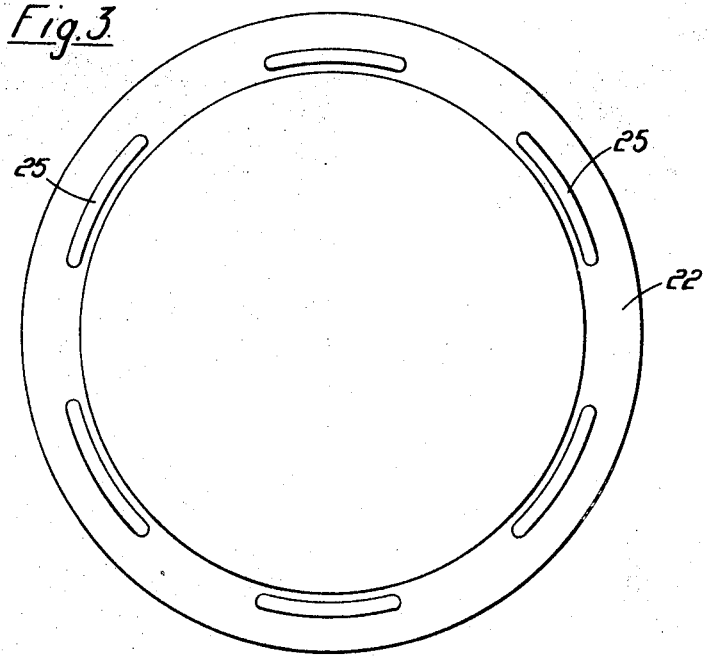
Figure 4:
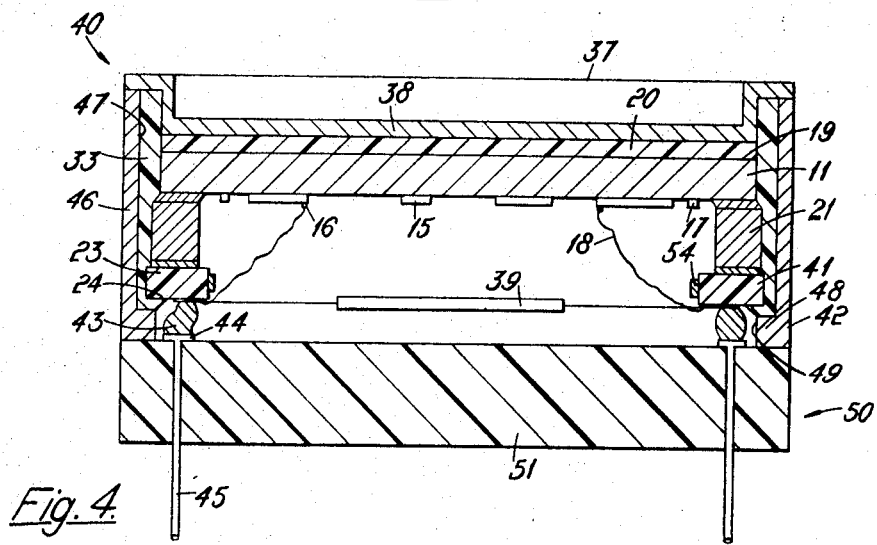
Figure 5:
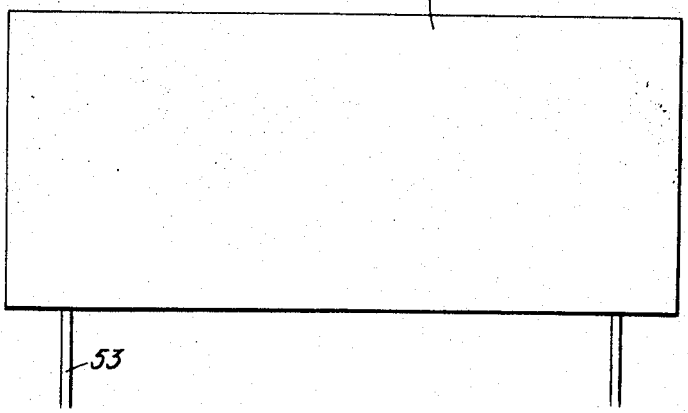

The present invention will now be described by way of example with reference to the accompanying drawings, in which FIG. 1 shows an arrangement of constituent piezo-resistive sensing elements of a pressure transducer formed in a semiconductor wafer, FIG. 2 is a cross-section of this wafer along the line II—II of FIG. 1 together with a housing for the wafer, FIG. 3 is a plan view of a metallized annular insulating member used in the assembling of the pressure transducer as shown in FIG. 2, and FIG. 4 is an equivalent view to that of FIG. 2 but of a pressure transducer assembly having a modified form of housing, together with associated ancillary apparatus, FIG. 5 shows a cooperating socket sub-unit adapted for association with the pressure/transducer shown in FIG. 4.

The pressure transducer 10 shown in FIG. 1 comprises a circular substrate of laminar form at least 0.03 inch in diameter and of monocrystalline semiconductor material which is N-type silicon doped with antimony. One major face of this substrate is lapped and polished so as to be orientated along the (111) and (110) crystal directions and a layer of P-type silicon doped with boron is deposited epitaxially thereon, the whole comprising a semiconductor wafer 11. A continuous layer of silicon oxide is formed over the epitaxial layer and then is selectively removed by known photolithographic techniques so that only the parts of the epitaxial layer required to form piezo-resistive strain sensing elements remain covered by the silicon oxide, These resistor sensing elements 12 are then defined by diffusing phosphorus into the epitaxial layer from the vapor phase, converting the non-masked parts of the epitaxial layer to N-conductivity type. The remaining silicon oxide is then removed from the wafer leaving the resistors 12 substantially electrically but not mechanically isolated by the P-N junctions serving to define them in the wafer 11. Resistors formed in this way are uniform in composition and have precisely controlled dimensions so that substantially identical resistors are formed adjacent to said one major face of the wafer 11 and spaced from the other major wafer face.

Due to the piezo-resistive property of the semiconductor material the resistance value of the substantially electrically isolated resistors 12 varies with different stresses applied to the wafer 11.

The resistivity value of the epitaxial layer in which the resistors 12 are formed is arranged to be such that the temperature coefficient of resistance of the resistors 12 has a minimum value commensurate with the device having optimum properties in respect of all the effects dependent on the impurity level of the sensing elements 12, and thus the transducer is not appreciably affected by changes in temperature.

The wafer 11, when assembled in its associated housing as shown in FIG. 2, comprises a flexible diaphragm held firmly around its periphery and obeys the Timoshenko formulae for stressed diaphragms clamped at their edges. When flexed by being subjected on one side to a pressure the parts of the wafer adjacent to its periphery are placed under compression and the central part of the wafer is placed under tension. Thus resistors positioned adjacent to the periphery decrease in value and resistors at the center of the wafer increase in value. In the resistor pattern shown in FIG. 1 the sensing elements are located on either side of the circle of minimum stress within the wafer, indicated at 13, and are arranged so that the changes in resistance due to both tension and compressive stresses are equal in magnitude but of opposite sense, the positioning of the peripheral resistors being more critical than the central ones. There is no appreciable stretching at the central plane within the wafer.

Each P-type resistor 12 is arranged along the (111) crystal direction of the wafer for convenience in the fabrication process although P-type resistors would have a maximum piezo-resistive response if orientated along the (110) crystal direction. Eight resistors are formed in the wafer and comprise four parallel closely spaced resistors symmetrically arranged about the center of the wafer and two pairs of U-shaped resistors are located adjacent to the periphery of the wafer. The pairs of the U-shaped resistors are arranged on diametrically opposite parts of the wafer and the components arms of these resistors are co-axial with the resistors at the center of the wafer.

Ohmic contacts 14 at the end of each resistor 12 are formed between the resistive semiconductor material and aluminum conducting strips 15 indicated in chain-line form in FIG. 1, which strips 15 extend from the contacts 14 to lead contacts 16 located at the imaginary circle 13 of minimum stress within the wafer. The aluminum conducting strips 15 are formed by depositing by evaporation an initially continuous layer of aluminum on the wafer face, this continuous layer being subsequently selectively removed by known photolithographic techniques. At the same time aluminum base pieces 17 for the U-shaped resistors 12 are provided on the wafer face at the radially outmost part of these resistors, these base pieces 17 having a low resistance value.

As shown in FIG. 2, gold wires 18 are bonded to the contacts 16 by thermo-compression techniques. The location of the contacts 16 on the wafer 11 ensures that connections between the aluminum strips 15 and the gold wires 18 are not subject to vibration fatigue.

Two of the central resistors and two of the U- shaped peripheral resistors 12 are selected for their closeness of matching with each other and are connected together to form the four arms of a Wheatstone Bridge circuit. The electrical output of the device, as indicated by a sensitive ammeter, is linerally variable in response to changes in pressure on the wafer diaphragm 11. Other resistors 12 may be employed as balancing or calibration resistors at any point in the Wheatstone Bridge circuit.

Current leakage may occur between the resistors 12 formed adjacent to one major face of the wafer 11 and the opposite major face 19 when a conductive medium the pressure of which is required to be measured is in contact with the opposite major wafer face 19. This would cause unbalanced earthing loops within the semiconductor wafer 11 and render the transducer 10 unreliable. However, the sensing elements 12 in the wafer 11 described above are isolated electrically from any conductive medium by an electrically insulating layer 20 of silicon dioxide, shown in FIG. 2, and deposited by evaporation on the non-resistor bearing major wafer face 19.

Circumferential parts of the resistor-bearing wafer face, as also is shown in FIG. 2, are alloyed to a metal ring 21, of the material sold under the trade mark Nilo 40, by heating the wafer and the ring to a temperature of 400° C. in an inert atmosphere with the ring 21 in its desired position on the wafer 11. The ring 21 protrudes from the major wafer face to which it is alloyed and imparts rigidity to the wafer. The metal ring 21 is then rigidly bonded by thermo-compression techniques and at a temperature of 300° C. to an insulating annular member 22. This member 22, which is of ceramic or high melting point polyamide material, has one plane surface 23 completely metallized, this surface cooperating with the metal ring 21. The other plane surface 24 of the insulating member 22 has six electrically discrete metallized pads 25, as shown in FIG. 3. The outer periphery of the insulating member 22 also is wholly metallized, each metallized part on the member 22 being of gold.

This composite structure is then inserted in a metal housing 26 and is secured therein. The metal housing 26 for the wafer 11 has a reduced-diameter portion 27 capped by an end part 28. The plane surface 24 of the insulating member 22 rests on the part 29 of the metal housing 26 defining the reduced-diameter bore portion 27, and the metallized radially outer periphery of the ceramic member 22 is secured to the part 30 of the metal housing 26 defining the increased-diameter bore portion 31 by solder indicated at 32 and of 200° C. melting point. The space left between the housing part 30 and the radially outer periphery of the metal ring 21, the silicon wafer 11 and the silicon dioxide layer 20 is filled with an epoxy resin 33 cured in situ by heating the assembly to a temperature of 150° C. In this way the wafer 11 is mounted in a stress-free manner and is electrically insulated from the metal housing 26 and the resistors 12 on the wafer are hermetically sealed within the housing 26. Further the wafer 11 is not affected by differential expansion between the component parts, but in any event the housing 26 is made of titanium, and has a similar coefficient of linear thermal expansion to that of the silicon wafer 11.

The wires 18 extend from the contacts 16 and are gold-ball-bonded to the pads 25 on the insulating member 22. A resilient tinned-copper intermediate member 34 comprising a leaf spring is soldered to each pad 25. These leaf springs 34 are arranged in the assembled transducer to be in compression between their associated pads 25 and leads 35 which extend externally of the metal housing 26. Each tinned-copper lead is pre-assembled in the capping part 28 of the metal housing 26 and extends from the housing 26 through glass seals 36.

The wafer 11 is subjected to the pressure to be measured by the silicon dioxide layer 20 being exposed to the pressure medium through the open end 37 of the metal housing 26. As stated above the pressure of the silicon dioxide layer 20 prevents unbalanced earthing loops within the semiconductor wafer 11 when the pressure medium is conductive in character. Thus D.C. flow from the wafer 11 is eliminated but it is possible that the transducer is rendered unstable when a conductive medium is in contact with the silicon dioxide layer 20 due to A.C. flow, for example, at R.F. In order to remove the possibility of such an effect occurring a metallic coating 38 is provided on the silicon dioxide layer 20 so as to make good electrical contact with the metal housing 26. In the illustrated embodiment a coating 38 of titanium is deposited by evaporation onto the silicon dioxide layer 20 when the wafer 11 is assembled in the titanium housing 26 and so makes good electrical contact at the open end 37 of the housing. Any desired constant potential may be applied to the housing, and so to the coating 38, so that the coating comprises a screen and in this way the transducer 10 is arranged to give repeatable results under all normally encountered operating conditions. The value of the potential applied to the housing 26 is arranged to be such that the transducer operates in a required predetermined manner, for example, the housing 26 and the coating 38 are maintained at zero potential by connecting the metal housing to the screen of a multiple-lead cable (not shown) for the device. The last-mentioned arrangement also has the advantage that the transducer performance is not adversely affected if more than one transducer is connected to a common voltage source. The cable leads may be soldered to the leads 35 of the transducer.

The silicon dioxide layer 20 and the conductive coating 38 do not significantly affect the stress characteristics of the semiconductor wafer diaphragm 11.

Two temperature sensing elements 39 are positioned within the housing 26 adjacent to the resistor sensing elements 12. A thin-film trimming resistor (not shown) is also provided on the insulating member 22, and this resistor and the temperature sensing elements 39 are included in the Wheatstone Bridge circuit so that the output signals of the device are compensated for temperature variations which would otherwise cause the magnitude of these output signals to vary. The temperature sensing members conveniently may be formed in the semiconductor wafer 11.

The sensing elements 12 for convenience are fabricated in a silicon wafer 11 of greater thickness than is either desirable or necessary for that of the diaphragm of the pressure transducer 10. The fabrication of these sensing elements 12 however is facilitated by forming them in a relatively thick wafer 11 and subsequently reducing the thickness of the wafer to the thickness required for use as as sensitive flexible diaphragm of the pressure transducer 10, by mechanically polishing the face 19 of this wafer.

In one specific embodiment of pressure transducer according to the present invention the silicon wafer is 0.2 inch in diameter and has an overall thickness of 0.004 inch with an epitaxial layer 0.0002 inch thick comprising part of the wafer thickness and defining the thickness of the piezo-resistive sensing elements formed therein. The wafer face opposite to the epitaxial layer has a layer of silicon dioxide formed thereon which is 0.0002 inch thick and has a resistance greater than 100 megohms. The silicon dioxide in turn is covered by a layer of titanium 0.0001 inch thick. The resistor sensing elements in the epitaxial layer are 0.001 inch wide and four resistors each 0.02 inch long are provided at the center of the wafer and four U-shaped resistors each of arm length 0.01 inch are formed adjacent to the periphery of the wafer. The resistivity of the substrate part of the wafer and of the epitaxially deposited material from which the resistors are formed is 0.01 ohm-cm. and the resistors are each 1,500 ohms in value. The transducer is able to measure accurately and reliably pressures in the range 0.0002 to 3,000 pounds per square inch and has the high natural frequency response of 100 Kilohertz.

Thus the wafer 11 is assembled in an open-ended housing 26 closely resembling a metal can of a conventional housing for semiconductor devices such as integrated circuits. The wafer 11 is manufactured, assembled and secured to its cooperating leads 35 by techniques known and proven in the manufacture and packaging of integrated circuits. Such techniques as the alloying of metal members to the semiconductor wafer, the soldering and the thermo-compression bonding of wires respectively to rigid electrical leads and to contacts on the semiconductor wafer, when employed in the assembly of a pressure transducer not only facilitate the assembly of the pressure transducer but provide an essentially reliable device. The features by which these beneficial results are obtained in the pressure transducer as described above are the alloying of the metal ring 21 to the semiconductor wafer 11, which ring 21 is in turn bonded to the cooperating metallized plane surface of the insulating annular member 22 secured to a metal housing 26. The metallized insulating annular member 22 provides means for electrically insulating the wafer 11 from the metal housing 26 and provides a suitable anchorage associated with the intermediate members 34 between the wires 18 and the leads 35 which extend externally of the metal housing 26.

A modified form of assembled pressure transducer is shown in FIG. 4 and in respect of which the same reference numerals are used to indicate indentical or closely resembling parts to those shown in FIGS. 1 to 3.

This modified construction 40 has on the gold pads 25 on the plane surface 24 of an insulating annular member 41, before the composite structure is assembled in a housing 42, masses of solder 43. The insulating member 41 resembles a conventional printed circuit board and is resilient in character. Thus the solder masses 43 are arranged to be forced against enlarged end pieces 44 of leads 45 which extend externally of the housing 42 and are secured to the leads by heating the device to 200° C. after assembly. The insulating member 41 is cemented by an epoxy resin 33 to a metal part 46 of the housing 42, this metal part 46 defining an increased-diameter bore portion 47. The housing 42 also has a metal part 48 defining a reduced-diameter bore portion 49 on which the wafer 11 rests, and this metal part 48 is capped by a connection member 50 cemented thereto and in the form of a conventional plug device of a plug-and-socket arrangement. The plug device 50 comprises an insulation block 51 which completes the encapsulation of the resistor sensing elements 12 and copper plug pieces comprise the leads 45 which extend externally of the housing 42.

Thus the pressure transducer assembly 40 comprises a discrete sub-unit of equipment including the pressure transducer. The interface between the pressure transducer 40 and another ancillary sub-unit 52 shown in FIG. 5 of such equipment, as shown in FIG. 4, comprises the plug device 50 and a cooperating socket associated with the other sub-unit 52. This robust construction implies that the desired interconnections between the piezo-resistive sensing elements 12 and ancillary apparatus are easily made, these interconnections being remote from the semiconductor wafer 11 with which they are incompatible.

The cooperating sub-unit 52 to be coupled to the pressure transducer 40 is also in the form of a module. It has external dimensions corresponding to those of the housing 42 and is arranged to be mounted coaxially therewith. The module 52 may comprise a solid state linear amplifier and voltage regulator to amplify the transducer output signal and to linearize the response of the device so that the magnitude of the current output is maintained in exact proportionality with the pressure of the medium to which the wafer diaphragm 11 is subjected. The module 52 has further plug pieces 53 protruding therefrom so that it may easily be coupled to other sub-units.

A thin-film trimming resistor 54 is shown on the insulating member 41.

A multiple-lead screen cable (not shown) terminating in a connection member is secured to the pressure transducer 40, the cable being either directly coupled to the connection member 50 comprising part of the housing 42 of the pressure transducer or is connected thereto via the sub-unit 52 of ancillary apparatus for the pressure transducer, The connection member 50 may comprise either a plug or socket device and may be arranged so that it is possible to couple more than one discrete sub-unit thereto or possibly one or more sub-units and a co-axial cable.

What we claim is:

1. A strain transducer including a semiconductor wafer having a plurality of piezo-resistive strain sensing elements formed adjacent to one major wafer face and defined by P-N junctions, a metal ring alloyed to circumferential parts of the semiconductor wafer, an annular member of insulating material having a plane surface at least partially metallized and cooperating with the metal ring to which it is bonded, a housing for the wafer secured to the insulating annular member and enclosing the major wafer face adjacent to the sensing elements with the opposite major wafer face arranged to be exposed to the medium the pressure of which is required to be measured, leads extending externally of the housing, wires extending between contacts to the sensing elements and said leads extending externally of the housing and intermediate means supported by said annular member within said housing for electrically connecting each wire to an associated lead through the intermediate means.

2. A transducer as claimed in claim 1 in which the wires extending from the contacts of the sensing elements are bonded to electrically discrete metallized pads provided on the insulating annular member, and the intermediate means are arranged to contact the metallized pads.

3. A transducer as claimed in claim 1 in which the intermediate means are resiliently deformable and each is mounted in compression between the insulating annular member and a lead extending externally of the housing.

4. A transducer as claimed in claim 3 in which the intermediate means are leaf springs.

5. A transducer as claimed in claim 1 in which the intermediate means are masses of deformable conductive material bonded between the insulating annular member and the leads extending externally of the housing.

6. A transducer as claimed in claim 1 in which a thin-film trimming resistor is provided on a surface of the insulating annular member within the housing.

7. A transducer as claimed in claim 1 in which the leads extending externally of the housing comprise the conductive parts of a connection member incorporated in the housing.

8. A transducer as set forth in claim 1 further including an electrically insulating layer on said opposite major face for electrically isolating the sensing elements in the wafer from the medium.

9. A transducer as set forth in claim 8 further including a metallic coating on the insulating layer.

10. A transducer as set forth in claim 8 wherein said housing is metallic, and further including a metallic coating on said insulating layer, said coating being in electrical contact with said housing, and a connection member capping said housing at one end, said connection member including said leads which extend externally of the housing.

11. A strain transducer including a semiconductor wafer having a plurality of piezo-resistive strain sensing elements formed adjacent to one major wafer face and defined by P-N junctions, a metal ring alloyed to circumferential parts of the semiconductor wafer, an annular member of insulating material having a plane surface at least partially metallized and cooperating with the metal ring to which it is bonded, a housing for the wafer secured to the insulating annular member and enclosing the major wafer face adjacent to the sensing elements with the opposite major wafer face arranged to be exposed to the medium the pressure of which is required to be measured leads extending through the housing, means for electrically connecting contacts to the sensing elements and said leads, said means including a resilient connection within the housing.

12. A transducer as claimed in claim 11 in which the electrical connecting means further includes wires extending from the contacts to the sensing elements to discrete metallized pads provided on the insulating annular member and resilient spring elements within the housing arranged to contact the metallized pads and the leads.

13. A transducer as claimed in claim 12 in which the spring elements are resiliently deformable and each is mounted in compression between the insulating annular member and a lead extending externally of the housing.

14. A transducer as claimed in claim 11 in which the resilient connection includes masses of deformable conductive material bonded between the insulating annular member and the leads extending externally of the housing, said insulating annular member being resilient in character.

15. A strain transducer as set forth in claim 11 wherein the outer periphery of said annular member is secured to the housing so as to support the metal ring and wafer such as to provide a space between the inner wall of the housing and the radial outer periphery of the metal ring and the wafer and insulative means within said space for electrically insulating said wafer from the housing.

* * * * *